(12) United States Patent
Xiong et al.

(10) Patent No.: US 11,115,850 B2
(45) Date of Patent: Sep. 7, 2021

(54) SERVICE INDICATION METHOD, BASE STATION, TERMINAL, AND SYSTEM

(71) Applicant: HUAWEI TECHNOLOGIES CO., LTD., Guangdong (CN)

(72) Inventors: Jianqiang Xiong, Shanghai (CN); Liuying Xie, Shanghai (CN); Yuehui Liu, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/425,421

(22) Filed: May 29, 2019

(65) Prior Publication Data
US 2019/0281488 A1 Sep. 12, 2019

Related U.S. Application Data

(63) Continuation of application No. PCT/CN2016/108165, filed on Nov. 30, 2016.

(51) Int. Cl.
*H04W 24/10* (2009.01)
*H04W 72/04* (2009.01)
(Continued)

(52) U.S. Cl.
CPC .......... *H04W 24/10* (2013.01); *H04L 5/00* (2013.01); *H04W 16/02* (2013.01); *H04W 72/048* (2013.01); *H04W 72/085* (2013.01)

(58) Field of Classification Search
CPC ... H04W 24/10; H04W 16/02; H04W 72/048; H04W 72/085; H04W 36/0085; H04L 5/00
See application file for complete search history.

(56) References Cited

U.S. PATENT DOCUMENTS

| 2011/0009123 A1* | 1/2011 | Queseth | H04W 4/06 455/450 |
| 2013/0308481 A1* | 11/2013 | Kazmi | H04W 24/02 370/252 |

(Continued)

FOREIGN PATENT DOCUMENTS

| CN | 103858482 A | 6/2014 |
| CN | 105309007 A | 2/2016 |

(Continued)

OTHER PUBLICATIONS

3GPP TS 36.331 V14.0.0 (Sep. 2016), 3rd Generation Partnership Project; Technical Specification Group Radio Access Network;Evolved Universal Terrestrial Radio Access (E-UTRA);Radio Resource Control (RRC);Protocol specification(Release 14), 643 pages.

(Continued)

*Primary Examiner* — Peter P Chau
(74) *Attorney, Agent, or Firm* — Womble Bond Dickinson (US) LLP

(57) ABSTRACT

Embodiments of the present disclosure provide a service indication method, a base station, a terminal, and a system. The method includes: sending, by the base station, first service indication information to the terminal, where the first service indication information includes an identifier of a first frequency channel number and an identifier of a first service associated with the first frequency channel number; determining, by the base station, a second service associated with a second frequency channel number; and sending second service indication information to the terminal, where the second service indication information includes the identifier of the first frequency channel number and an identifier of the second service. In the solution in the embodiments of the present disclosure, after indicating a service associated with a frequency channel number, a service identifier may further (Continued)

indicate a service associated with another frequency channel number with a same physical frequency.

8 Claims, 7 Drawing Sheets

(51) Int. Cl.
*H04W 72/08* (2009.01)
*H04L 5/00* (2006.01)
*H04W 16/02* (2009.01)

(56) References Cited

U.S. PATENT DOCUMENTS

| | | |
|---|---|---|
| 2014/0302821 A1 | 10/2014 | Hwang et al. |
| 2015/0245294 A1 | 8/2015 | Sikri et al. |
| 2016/0007350 A1 | 1/2016 | Xiong et al. |
| 2017/0238204 A1* | 8/2017 | Uchino .............. H04W 24/10 370/252 |
| 2020/0092766 A1* | 3/2020 | Alriksson ......... H04W 36/0072 |

FOREIGN PATENT DOCUMENTS

| | | |
|---|---|---|
| CN | 105357686 A | 2/2016 |
| CN | 105792321 A | 7/2016 |
| CN | 105830491 A | 8/2016 |
| CN | 106034016 A | 10/2016 |

OTHER PUBLICATIONS

3GPP TS 36.101 V14.1.0 (Sep. 2016), 3rd Generation Partnership Project;Technical Specification Group Radio Access Network;Evolved Universal Terrestrial Radio Access (E-UTRA);User Equipment (UE) radio transmission and reception(Release 14), 1187 pages.
New Postcom,"Discussion on MFBI UE measurement",3GPP TSG RAN WG2 Meeting #81bis R2-130999,Chicago, USA, Apr. 15-19, 2013,total 2 pages.
Samsung,"Invalid measurement configuration with different (E)-ARFCN",3GPP TSG RAN WG2 #80 R2-125806,New Orleans, USA, Nov. 12-16, 2012,Change Request 36.331 CR rev Current version:11.1.0,total 8 pages.
China Mobile Communications Corporation, Addition of MFBI-support in idle mode in GERAN. 3GPP TSG-GERAN Meeting #63, Ljubljana, Slovenia, Aug. 25-29, 2014, GP-140489, 4 pages.

* cited by examiner

SERVICE INDICATION METHOD, BASE STATION, TERMINAL, AND SYSTEM

CROSS-REFERENCE TO RELATED APPLICATIONS

This application is a continuation of International Application No. PCT/CN2016/108165, filed on Nov. 30, 2016, the disclosure of which is hereby incorporated by reference in its entirety.

TECHNICAL FIELD

Embodiments of the present disclosure relate to wireless communications technologies, and in particular, to a service indication method, a base station, a terminal, and a system.

BACKGROUND

A correspondence between each frequency band of an evolved universal terrestrial radio access network (E-UTRAN) and a physical frequency is defined in the 3rd Generation Partnership Project (3GPP) standard, and some physical frequencies may belong to a plurality of frequency bands. For example, uplink frequencies 704 megahertz (MHz) to 716 MHz and downlink frequencies 734 MHz to 746 MHz belong to both a frequency band 12 and a band 17. For a working cell, if the cell supports two frequency bands, a terminal that supports either of the frequency bands may obtain a service in the cell. For example, if a cell supports the band 12 and the band 17, a terminal that supports the band 17 may obtain a service in the cell, and a terminal that supports the band 12 may also obtain a service in the cell.

In a carrier aggregation (CA) scenario, the cell may perform carrier aggregation based on a CA band combination capability reported by a terminal. However, when carrier aggregation is performed between a first cell and a second cell, the terminal supports a plurality of frequency bands, and the first cell needs to send a service for the second cell based on different frequency channel numbers, a conflict occurs between the foregoing services for the different frequency channel numbers if physical frequencies of the different frequency channel numbers are the same.

SUMMARY

Embodiments of the present disclosure provide a service indication method, a base station, a terminal, and a system, to resolve a problem of a conflict between services for different frequency channel numbers.

According to one aspect, an embodiment of the present disclosure provides a service indication method, used in a communications system, where the communications system includes a base station and a terminal, the terminal supports a first frequency channel number and a second frequency channel number, a physical frequency of the first frequency channel number is the same as a physical frequency of the second frequency channel number, and the method includes: sending, by the base station, first service indication information to the terminal, where the first service indication information includes an identifier of the first frequency channel number and an identifier of a first service associated with the first frequency channel number; determining, by the base station, a second service associated with the second frequency channel number; and sending, by the base station, second service indication information to the terminal, where the second service indication information includes the identifier of the first frequency channel number and an identifier of the second service.

In the solution in this embodiment of the present disclosure, when the base station sends, to the terminal, the first service indication information that carries the identifier of the first frequency channel number, and subsequently delivers the second service indication information, because the physical frequency of the to-be-indicated measurement object, the second frequency channel number, is the same as that of the first frequency channel number, the first frequency channel number is multiplexed. To be specific, the identifier of the first frequency channel number is carried in the second service indication information, so that after indicating a service associated with a frequency channel number, a service identifier may further indicate a service associated with another frequency channel number with a same physical frequency, avoiding a service conflict caused by a same physical frequency of different frequency channel numbers.

In a possible design, the first frequency channel number may be a primary frequency channel number, and the second frequency channel number may be a secondary frequency channel number. After sending the second service indication information to the terminal, the base station may further send a deletion instruction to the terminal, where the deletion instruction is used to instruct the terminal to delete the first service indication information and the second service indication information; determine a third service associated with the second frequency channel number; and send third service indication information to the terminal, where the third service indication information includes an identifier of the second frequency channel number and an identifier of the third service.

In this possible design, the first service may include at least one of the following: a measurement report MR algorithm measurement service, a handover algorithm measurement service, or an automatic neighbor relation ANR algorithm measurement service; and the second service may include a carrier aggregation measurement service.

In another possible design, the first frequency channel number may be a secondary frequency channel number, and the second frequency channel number may be a primary frequency channel number.

In this possible design, the first service may include a carrier aggregation measurement service, and the second service may include at least one of the following: an MR algorithm measurement service, a handover algorithm measurement service, or an ANR algorithm measurement service.

According to another aspect, an embodiment of the present disclosure provides another service indication method, used in a communications system, where the communications system includes a base station and a terminal, the terminal supports a first frequency channel number and a second frequency channel number, a physical frequency of the first frequency channel number is the same as a physical frequency of the second frequency channel number, and the method includes: determining, by the base station based on a frequency band combination supported by the terminal, that a second service is associated with the second frequency channel number, where the frequency band combination supported by the terminal includes a frequency band corresponding to the second frequency channel number; associating, by the base station, a first service with the second frequency channel number; sending, by the base station, first service indication information to the terminal, where the first service indication information includes an identifier of the second frequency channel number and an identifier of the first service; and sending, by the base station, second service indication information to the terminal, where the second service indication information includes the identifier of the second frequency channel number and an identifier of the second service.

In the solution in this embodiment of the present disclosure, the base station first determines, based on the frequency band combination supported by the terminal, that the frequency band combination supported by the terminal includes the frequency band corresponding to the second frequency channel number, further associates the first service with the second frequency channel number, and uses the second frequency channel number as an indication object when sending a service indication. To be specific, the base station sends the first service indication information to the terminal, where the first service indication information includes the identifier of the second frequency channel number and the identifier of the first service. Subsequently, the base station sends the second service indication information to the terminal, where the second service indication information includes the identifier of the second frequency channel number and the identifier of the second service, so that a frequency channel number of a to-be-indicated service is first unified, and then an indication is performed, avoiding a service conflict caused by a same physical frequency of different frequency channel numbers.

In a possible design, before determining, based on the frequency band combination supported by the terminal, that the second service is associated with the second frequency channel number, the base station may further determine the first service and the second service that need to be performed by the terminal.

In a possible design, the first frequency channel number may be a primary frequency channel number, and the second frequency channel number may be a secondary frequency channel number.

In this possible design, the first service may include at least one of the following: an MR algorithm measurement service, a handover algorithm measurement service, or an ANR algorithm measurement service, and the second service may include a carrier aggregation measurement service.

According to still another aspect, an embodiment of the present disclosure provides a base station, and the base station can implement a function performed by the base station in the foregoing method embodiments. The function may be implemented by using hardware, or may be implemented by hardware by executing corresponding software. The hardware or the software includes one or more modules corresponding to the function.

In a possible implementation, a structure of the base station includes a processor and a transceiver. The processor is configured to support the base station in performing a corresponding function in the foregoing method. The transceiver is configured to support the base station in communicating with a terminal. The base station may further include a memory. The memory is configured to be coupled to the processor, and stores a program instruction and data that are necessary for the base station.

According to still another aspect, an embodiment of the present disclosure provides a terminal, and the terminal can implement a function performed by the terminal in the foregoing method embodiments. The function may be implemented by using hardware, or may be implemented by hardware by executing corresponding software. The hardware or the software includes one or more modules corresponding to the function.

In a possible implementation, a structure of the terminal includes a processor and a transceiver. The processor is configured to support the terminal in performing a corresponding function in the foregoing method. The transceiver is configured to support the terminal in communicating with a base station. The terminal may further include a memory. The memory is configured to be coupled to the processor, and stores a program instruction and data that are necessary for the terminal.

According to yet another aspect, an embodiment of the present disclosure provides a computer storage medium, configured to store a computer software instruction used by the foregoing base station, and the computer storage medium includes a program designed for performing the foregoing aspects.

According to yet another aspect, an embodiment of the present disclosure provides a computer storage medium, configured to store a computer software instruction used by the foregoing terminal, and the computer storage medium includes a program designed for performing the foregoing aspects.

According to yet another aspect, an embodiment of the present disclosure provides a computer program product that includes instructions, and when the instructions are executed by a computer, the instruction enables the computer to perform a function performed by the base station in the foregoing method design.

According to yet another aspect, an embodiment of the present disclosure provides a computer program product that includes an instruction, and when the instructions are executed by a computer, the instruction enables the computer to perform a function performed by the terminal in the foregoing method design.

According to yet another aspect, an embodiment of the present disclosure provides a communications system, and the system includes the base station and the terminal that are described in the foregoing aspects.

Compared with the prior art, in the solution in the embodiments of the present disclosure, when the base station first sends, to the terminal, the first service indication information that carries the identifier of the first frequency channel number, and then delivers the second service indication information, because the physical frequency of the to-be-indicated measurement object, the second frequency channel number, is the same as that of the first frequency channel number, the first frequency channel number is multiplexed. To be specific, the identifier of the first frequency channel number is carried in the second service indication information, so that after indicating the service associated with a frequency channel number, the service identifier may further indicate the service associated with the another frequency channel number with the same physical frequency, avoiding the service conflict caused by the same physical frequency of the different frequency channel numbers.

DESCRIPTION OF EMBODIMENTS

The following describes technical solutions in embodiments of the present disclosure with reference to accompanying drawings. The following first explains and describes some terms in the embodiments of the present disclosure.

A base station, also referred to as a radio access network (RAN) device, is a device that connects a terminal to a radio network. The base station may be a base transceiver station (BTS) in a Global System for Mobile Communications (GSM) or Code Division Multiple Access (CDMA), or may be a NodeB (NB) in Wideband Code Division Multiple Access (WCDMA), or may be an evolved NodeB (Evolved NodeB, eNB or eNodeB) in Long Term Evolution (LTE), a relay node or an access point, a base station in a 5G network, a base station that may appear in another network in the future, or the like. This is not limited herein.

A terminal may be a wireless terminal or a wired terminal. The wireless terminal may be a device that provides a user with voice and/or other service data connectivity, a handheld device with a radio connection function, or another processing device connected to a radio modem. The wireless terminal may communicate with one or more core networks through a RAN. The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus that exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station (MS), a mobile console (mobile), a remote station, a remote terminal, an access terminal, a user terminal, a user agent, or user equipment (UE). This is not limited herein.

In the embodiments of the present disclosure, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
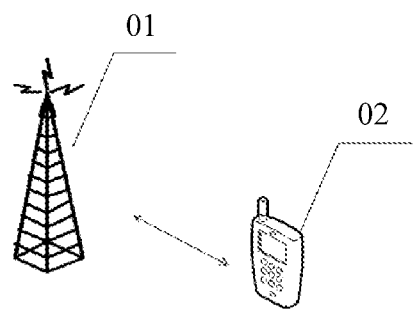
FIG. 1 is a framework diagram of a communications system.

FIG. 1 is a framework diagram of a communications system. As shown in FIG. 1, the communications system includes a base station 01 and a terminal 02, and the base station 01 wirelessly communicates with the terminal. The terminal 02 supports a first frequency channel number and a second frequency channel number. One of the first frequency channel number and the second frequency channel number may be a primary frequency channel number, and the other is a secondary frequency channel number. This is not limited herein.

Figure 2:
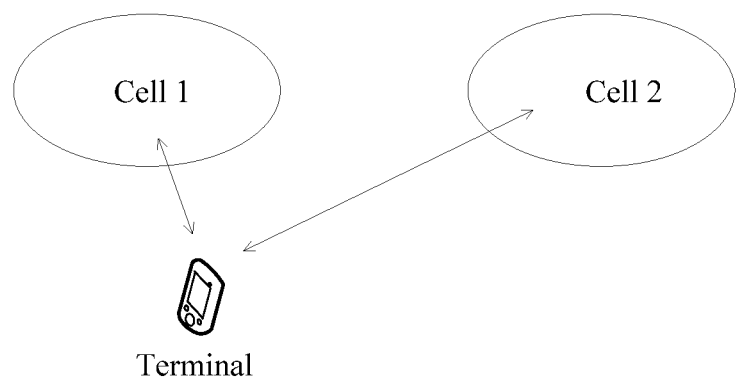
FIG. 2 is a schematic diagram of a CA scenario.

FIG. 2 is a schematic diagram of a CA scenario. CA is introduced in 3GPP, and a plurality of contiguous or non-contiguous component carriers (CC) are aggregated to obtain a larger bandwidth, thereby meeting a 3GPP requirement. As shown in FIG. 2, a terminal accesses a wireless network in a cell 1, and the terminal is a terminal that supports the CA, and may report a CA band combination capability to a base station in which the cell 1 is located. The base station in which the cell 1 is located may configure a cell 2 as a secondary cell for the terminal based on the CA band combination capability reported by the terminal, so that the cell 1 and the cell 2 jointly transmit data for the terminal. A base station in which the cell 2 is located is a secondary base station. The base station in which the cell 1 is located and the base station in which the cell 2 is located may be a same base station, or may be different base stations. The cell 1 is a primary cell, and corresponds to a primary component carrier (PCC). The cell 2 is the secondary cell, and corresponds to a secondary component carrier (SCC).

FIG. 2 shows the CA scenario in which two CCs are used as an example. In practice, more CCs may be aggregated to serve the terminal.

For a case in which an operating frequency of a cell belongs to a plurality of frequency bands, the 3GPP protocol proposes to add a multiple frequency band indicator (MFBI) field to a system message, so as to identify whether the cell supports the plurality of frequency bands.

Figure 3:
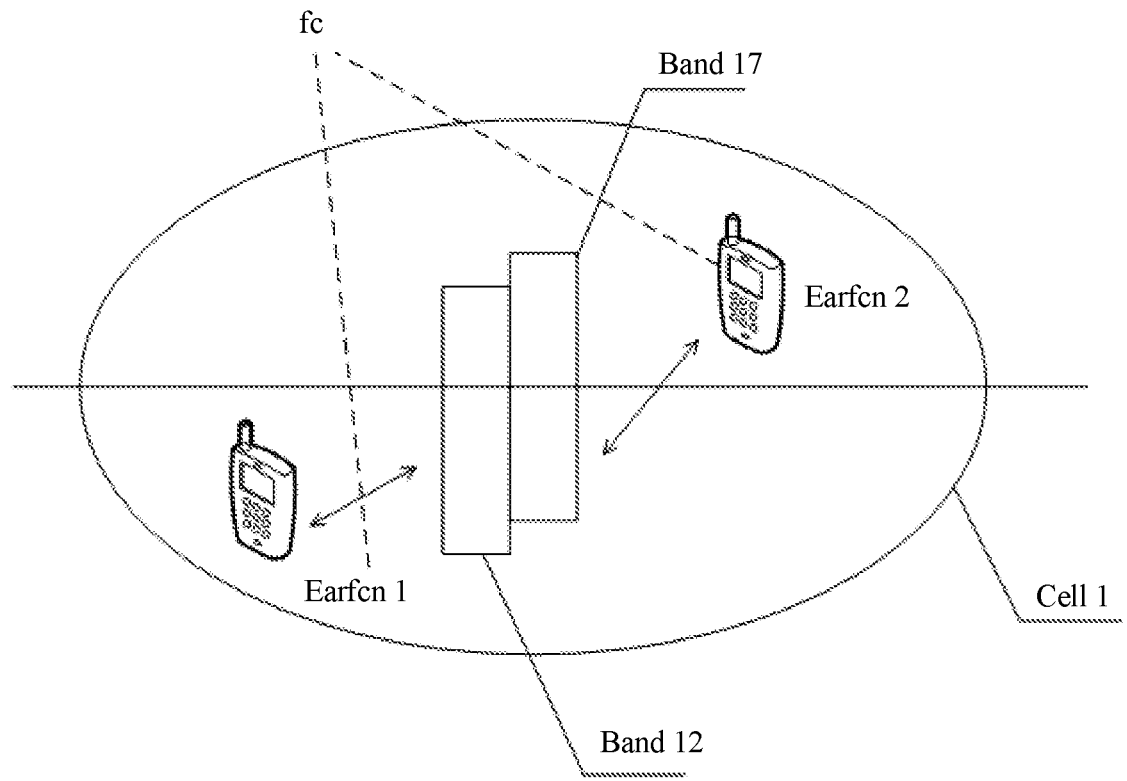
FIG. 3 is a schematic diagram of a multiple frequency band scenario.

FIG. 3 is a schematic diagram of a multiple frequency band scenario. As shown in FIG. 3, a cell 1 supports both a band 12 and a band 17. A terminal that supports the band 12 or the band 17 can obtain a service in the cell 1. For a same physical frequency fc, frequency channel numbers in the band 12 and the band 17 are different, and are denoted as Earfcn 1 and Earfcn 2 respectively. One of the two frequency channel numbers is a primary frequency band frequency channel number (primary frequency channel number) and the other is a secondary frequency band frequency channel number (secondary frequency channel number). The primary frequency channel number and the secondary frequency channel number may be identified by a configuration parameter of a frequency channel number. If no parameter is configured, a base station considers that a frequency channel number with a minimum frequency band number is the primary frequency channel number, and another frequency channel number with a same physical frequency as that of the primary frequency band frequency channel number is the secondary frequency channel number.

After an MFBI is introduced, CA is affected to some extent. Specifically, when determining whether to perform the carrier aggregation, the base station considers a CA band combination capability that is reported by the terminal to the base station and a frequency band of a to-be-aggregated cell. The CA band combination capability is used to indicate bands between which the carrier aggregation supported by the terminal can be performed.

(1) When the to-be-aggregated cell supports a plurality of frequency bands, the carrier aggregation can be performed if the CA band combination capability reported by the terminal intersects with a primary frequency band or a secondary frequency band of the to-be-aggregated cell. The CA band combination capability indicates one or more frequency bands supported by the terminal.

(2) When the to-be-aggregated cell does not support a plurality of frequency bands, the carrier aggregation can be performed if the CA band combination capability reported by the terminal intersects with a frequency band supported by the aggregated cell. The CA band combination capability indicates a frequency band supported by the terminal.

(3) When a service conflict occurs, to be specific, the base station has delivered a service indication of a frequency channel number, and another frequency channel number with a same physical frequency as a physical frequency of the frequency channel number is a target frequency channel number expected for the carrier aggregation, the carrier aggregation cannot use these frequency channel numbers.

In view of this, in an embodiment of the present disclosure, a service indication method is provided to resolve a service conflict problem. A solution in this embodiment of the present disclosure can resolve the service conflict problem by multiplexing a frequency channel number.

Specifically, a service in this embodiment of the present disclosure may include: event measurement, periodic measurement, CA measurement, and the like. The following separately describes the event measurement, the periodic measurement, and the CA measurement in brief.

The event measurement may include:

A1 event: Signal quality of a serving cell is higher than a corresponding threshold.

A2 event: Signal quality of the serving cell is lower than a corresponding threshold.

A3 event: Signal quality of a neighboring cell of a primary cell is higher than signal quality of the primary cell by a specific threshold.

A4 event: Signal quality of the neighboring cell of the primary cell is higher than a corresponding threshold.

A5 event: Signal quality of the primary cell is lower than a threshold 1 and signal quality of the neighboring cell of the primary cell is higher than a threshold 2.

A6 event: Signal quality of an intra-frequency neighboring cell of a secondary cell is higher than that of the secondary cell by a specific threshold. The base station may change the secondary cell without changing the primary cell through the A6 event.

The periodic measurement may be measurement that is not triggered by an event, where there is no evaluation condition such as a threshold, but may be measurement in which when information can be obtained, the information is reported to the base station at a periodic interval. The periodic measurement may include strongest cell measurement, cell global identification (CGI) measurement, and the like.

The event measurement or the periodic measurement may be triggered by a corresponding preset algorithm. The preset algorithm may include a measurement report (MR) algorithm, a handover algorithm, an automatic neighbor relation (ANR) algorithm, and the like.

The CA measurement may support secondary frequency band measurement. To be specific, a service indication of the CA measurement may be performed for a secondary frequency channel number. Measurement triggered by another algorithm may support both the secondary frequency channel number and a primary frequency channel number.

Figure 4:
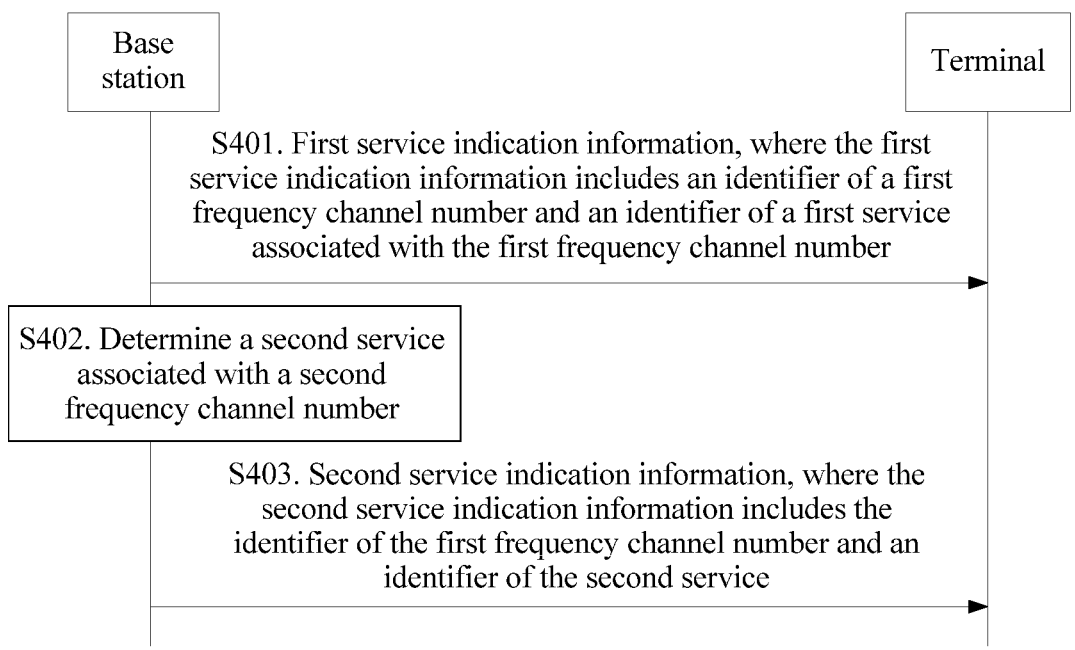
FIG. 4 is a communication schematic diagram of a service indication method according to an embodiment of the present disclosure.

FIG. 4 is a communication schematic diagram of a service indication method according to an embodiment of the present disclosure. The method is used in a communications system. The communications system includes a base station and a terminal, the terminal supports both a first frequency channel number and a second frequency channel number, and a physical frequency of the first frequency channel number is the same as a physical frequency of the second frequency channel number. As shown in FIG. 4, the method includes the following operations.

Operation S401. The base station sends first service indication information to the terminal, where the first service indication information includes an identifier of the first frequency channel number and an identifier of a first service associated with the first frequency channel number.

The first service may be one or more services that are based on the first frequency channel number. After determining the one or more services that are based on the first frequency channel number, the base station sends the first service indication information to the terminal, to indicate the one or more services that are based on the first frequency channel number.

In an example, after receiving the first service indication information sent by the base station, the terminal may perform the first service based on the first frequency channel number and the first service indication information. In one embodiment, the terminal may further feed back an acknowledgement message to the base station. This is not limited herein.

The first service may be a measurement event, and the first frequency channel number may be a measurement object of the measurement event.

Operation S402. The base station determines a second service associated with the second frequency channel number.

The second service may be one or more services associated with the second frequency channel number, namely, one or more services that are based on the second frequency channel number.

In one embodiment, the base station may alternatively determine the second service associated with the second frequency channel number before sending the first service indication information. In other words, operation S402 may be performed before operation S401 is performed.

Operation S403. The base station sends second service indication information to the terminal, where the second service indication information includes the identifier of the first frequency channel number and an identifier of the second service.

Specifically, after sending, to the terminal, the first service indication information that includes the identifier of the first frequency channel number and the identifier of the first service, and when needing to send, to the terminal, a service indication of the second service associated with the second frequency channel number, the base station finds that the physical frequency of the second frequency channel number is the same as the physical frequency of the first frequency channel number, and cannot add an identifier of the second frequency channel number to the service indication. In this case, in the solution of this embodiment of the present disclosure, the identifier of the first frequency channel number is multiplexed to indicate the second service to the terminal. To be specific, the identifier of the first frequency channel number and the identifier of the second service are carried in the second service indication information, so that the base station can indicate the second service to the terminal, thereby avoiding a service conflict.

In an example, after receiving the second service indication information, the terminal may perform the second service based on the first frequency channel number and the second service indication information. In one embodiment, the terminal may further feed back an acknowledgement message to the base station. This is not limited herein.

In an example, the first frequency channel number may be a primary frequency channel number, and the second frequency channel number may be a secondary frequency channel number. In this case, after sending the second service indication information to the terminal, the base station may further send a deletion instruction to the terminal, where the deletion instruction is used to instruct the terminal to delete the first service indication information and the second service indication information; determine a third service associated with the second frequency channel number; and send third service indication information to the terminal, where the third service indication information includes the identifier of the second frequency channel number and an identifier of the third service.

In the foregoing example, the first service may include at least one of the following: an MR algorithm measurement service, a handover algorithm measurement service, or an ANR algorithm measurement service, and the second service may include a carrier aggregation measurement service.

In another example, the first frequency channel number may be a secondary frequency channel number, and the second frequency channel number may be a primary frequency channel number. In this case, the first service may include a carrier aggregation measurement service, and the second service may include at least one of the following: an MR algorithm measurement service, a handover algorithm measurement service, or an ANR algorithm measurement service.

In this embodiment of the present disclosure, when the base station first sends, to the terminal, the first service indication information that carries the identifier of the first frequency channel number, and then delivers the second service indication information, because the physical frequency of the to-be-indicated measurement object, the second frequency channel number, is the same as that of the first frequency channel number, the first frequency channel number is multiplexed. To be specific, the identifier of the first frequency channel number is carried in the second service indication information, so that after indicating a service associated with a frequency channel number, a service identifier may further indicate a service associated with another frequency channel number with a same physical frequency, avoiding a service conflict caused by the same physical frequency.

In one embodiment, if the first frequency channel number is the secondary frequency channel number, and the second frequency channel number is the primary frequency channel number, to be specific, when a service indication based on the secondary frequency channel number is first delivered, and a service indication based on the primary frequency channel number is subsequently sent, the secondary frequency channel number may be directly multiplexed, to be specific, the identifier of the secondary frequency channel number and a service identifier that is originally intended to indicate the primary frequency channel number are carried.

Figure 5:
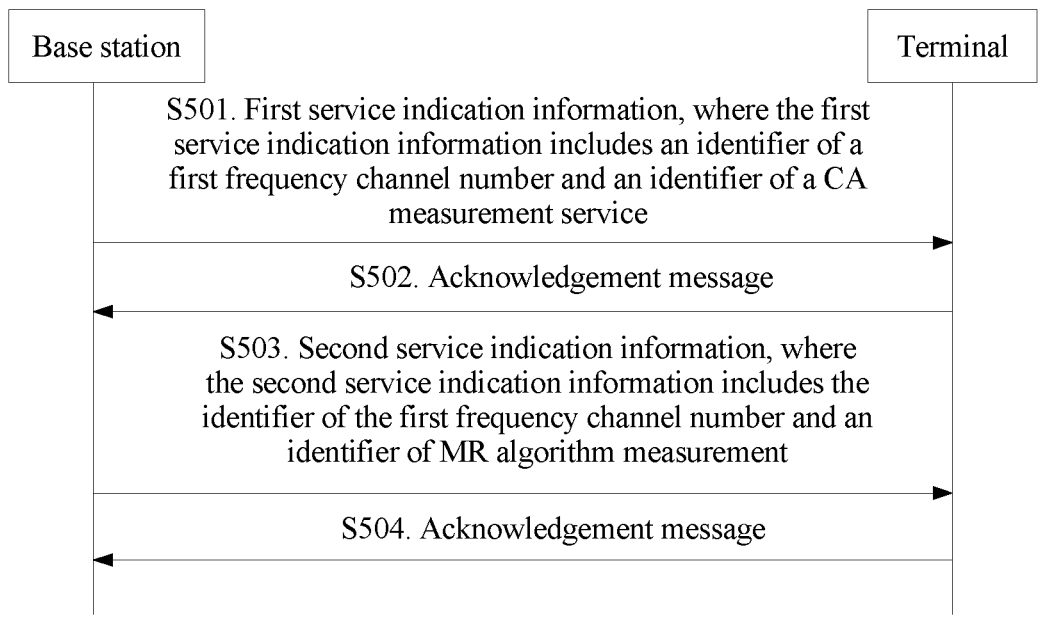
FIG. 5 is a communication schematic diagram of another service indication method according to an embodiment of the present disclosure.

FIG. 5 is a communication schematic diagram of another service indication method according to an embodiment of the present disclosure. If a first frequency channel number is a secondary frequency channel number, and a second frequency channel number is a primary frequency channel number, and a second service supports both the secondary frequency channel number and the primary frequency channel number, second service indication information may directly multiplex the secondary frequency channel number.

A first service may be a CA measurement service, namely, measurement triggered by a CA algorithm. The second service may include at least one of the following: MR algorithm measurement, handover algorithm measurement, or ANR algorithm measurement.

The measurement triggered by the CA algorithm supports only the secondary frequency channel number. The MR algorithm measurement, the handover algorithm measurement, and the ANR algorithm measurement support both the primary frequency channel number and the secondary frequency channel number.

The method shown in FIG. 5 includes the following operations.

Operation S501. A base station sends first service indication information to a terminal, where the first service indication information includes an identifier of a first frequency channel number and an identifier of a CA measurement service.

Operation S502. The terminal sends an acknowledgement message to the base station.

Operation S503. The base station sends second service indication information to the terminal, where the second service indication information includes the identifier of the first frequency channel number and an identifier of MR algorithm measurement.

Herein, the MR algorithm measurement is used as an example. The MR algorithm measurement may be replaced with the handover algorithm measurement and the ANR algorithm measurement (for example, event measurement A3/A4/A5). A carried service identifier may be "A3/A4/A5". This is not limited herein.

Operation S504. The terminal sends an acknowledgement message to the base station.

The first service indication information, the second service indication information, and the acknowledgement message may be carried through radio resource control (RRC) signaling. This is not limited herein.

Figure 6:
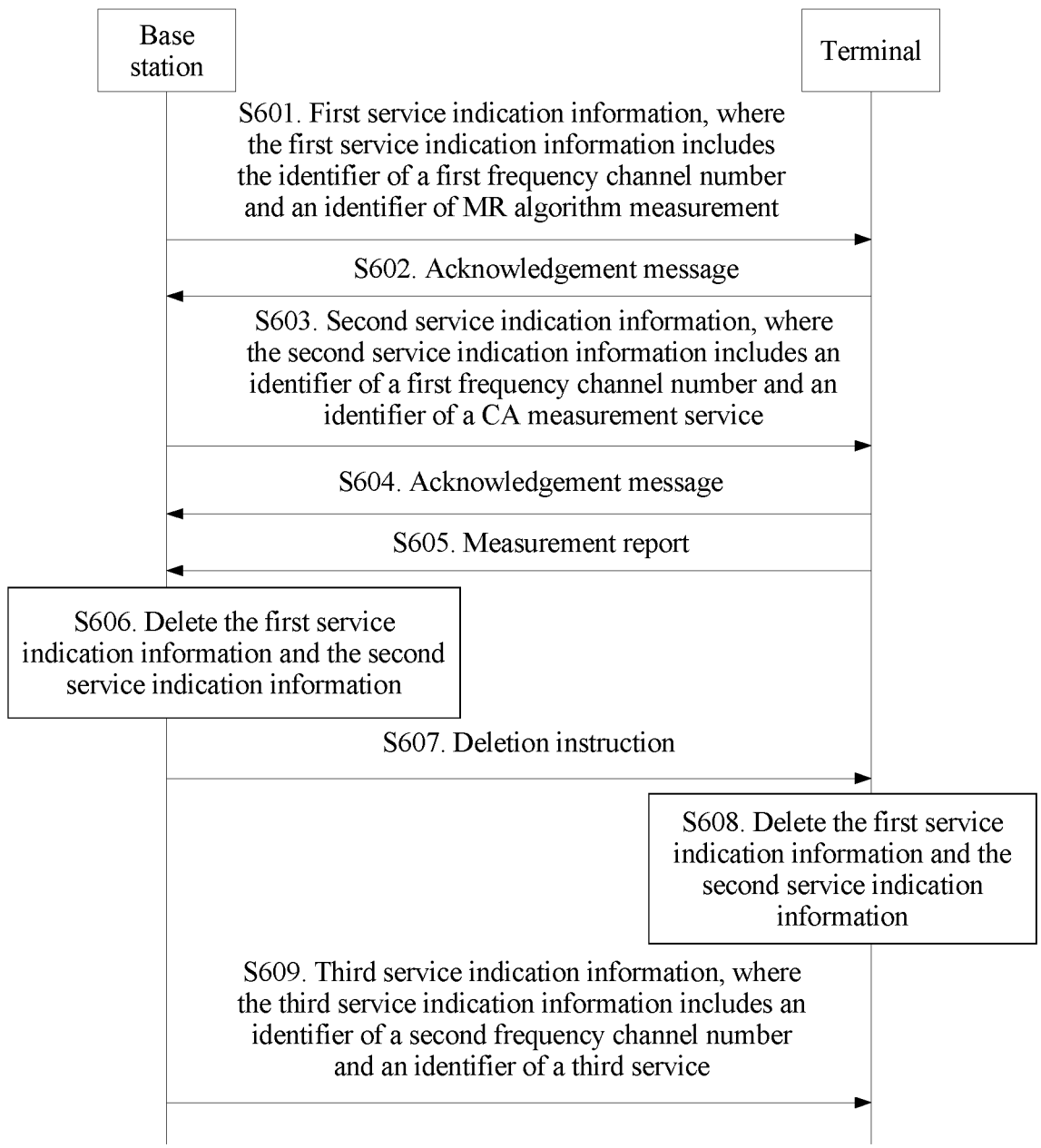
FIG. 6 is a communication schematic diagram of another service indication method according to an embodiment of the present disclosure.

FIG. 6 is a communication schematic diagram of still another service indication method according to an embodiment of the present disclosure. If a first frequency channel number is a primary frequency channel number, and a second frequency channel number is a secondary frequency channel number, in one embodiment, a second service supports the secondary frequency channel number.

A first service includes at least one of the following: MR algorithm measurement, handover algorithm measurement, or ANR algorithm measurement. The second service may be a CA measurement service.

To be specific, in this embodiment of the present disclosure, a service indication based on the primary frequency channel number (for example, inter-frequency measurement "A3/A4/A5" triggered by an MR algorithm/a handover algorithm/an ANR algorithm) is first delivered, and a service based on the secondary frequency channel number (for example, CA measurement triggered by a CA algorithm) is subsequently triggered. In this case, the primary frequency channel number may be first multiplexed to deliver second service indication information. After receiving the second service indication information, a terminal determines the second service, and uses the primary frequency channel number as a corresponding secondary frequency channel number for processing, that is, performs the second service based on the corresponding secondary frequency channel number. To be specific, although the primary frequency channel number is multiplexed to deliver the service indication information, the terminal uses a measurement object as the secondary frequency channel number for processing, in other words, the terminal performs the second service by using the secondary frequency channel number as an execution object.

Operation S601. A base station sends first service indication information to a terminal, where the first service indication information includes an identifier of a first frequency channel number and an identifier of MR algorithm measurement.

Herein, the MR algorithm measurement is used as an example. The MR algorithm measurement may be replaced with the handover algorithm measurement and the ANR algorithm measurement (for example, event measurement A4/A5). A carried service identifier may be "A4/A5". This is not limited herein.

Operation S602. The terminal sends an acknowledgement message to the base station.

Operation S603. The base station sends second service indication information to the terminal, where the second service indication information includes the identifier of the first frequency channel number and an identifier of a CA measurement service.

Operation S604. The terminal sends an acknowledgement message to the base station.

Operation S605. The terminal sends a measurement report to the base station. The measurement report includes a CA measurement result, and may further include at least one of the following based on the first service indication information: an MR algorithm measurement result, a handover algorithm measurement result, an ANR algorithm measurement result, or the like.

Operation S606. The base station deletes the first service indication information and the second service indication information.

Operation S607. The base station sends a deletion instruction to the terminal, to instruct the terminal to delete the first service indication information and the second service indication information.

Alternatively, the deletion instruction is used to instruct the terminal to delete the first service indication information.

Operation S608. The terminal deletes the first service indication information and the second service indication information.

If the deletion instruction is used to instruct the terminal to delete the first service indication information, only the first service indication information is deleted, to be specific, the MR algorithm measurement, the handover algorithm measurement, or the ANR algorithm measurement is deleted. If measurement has been performed, a measurement result is also deleted together.

In one embodiment, after completing deletion, the terminal may also send acknowledgement information to the base station.

Operation S609. The base station sends third service indication information to the terminal, where the third service indication information includes an identifier of a second frequency channel number and an identifier of a third service.

When the CA algorithm triggers the CA measurement that is based on the secondary frequency channel number, the base station starts to configure an SCC. After receiving a CA measurement report sent by the terminal, the base station adds the SCC based on the CA measurement report. A secondary cell of the terminal formally serves the terminal only after the SCC is successfully configured.

After the SCC is successfully configured, the base station releases the CA measurement and other measurement that is based on the first frequency channel number. Specifically, the base station may delete the previous first service indication information and/or the previous second service indication information, and instruct the terminal to also delete the previous first service indication information and/or the previous second service indication information, so that the base station sends new service indication information by using the secondary frequency channel number as the execution object. The new service indication information integrates and updates a previous service that is based on the primary frequency channel number and/or a previous service that is based on the secondary frequency channel number to form the third service indication information for delivery. The third service mainly includes measurement for the SCC, for example, A6 measurement, and an A6 measurement result directly affects a change of the secondary cell.

For example, a service indicated in the previous first service indication information includes "A4/A5", and a service indicated in the previous second service indication information includes "CA measurement". After the first service indication information and the second service indication information are deleted, the third service indication information newly delivered by the base station includes the identifier of the second frequency channel number and an identifier of "A2/A6". Certainly, this is not limited by this example.

Figure 7:
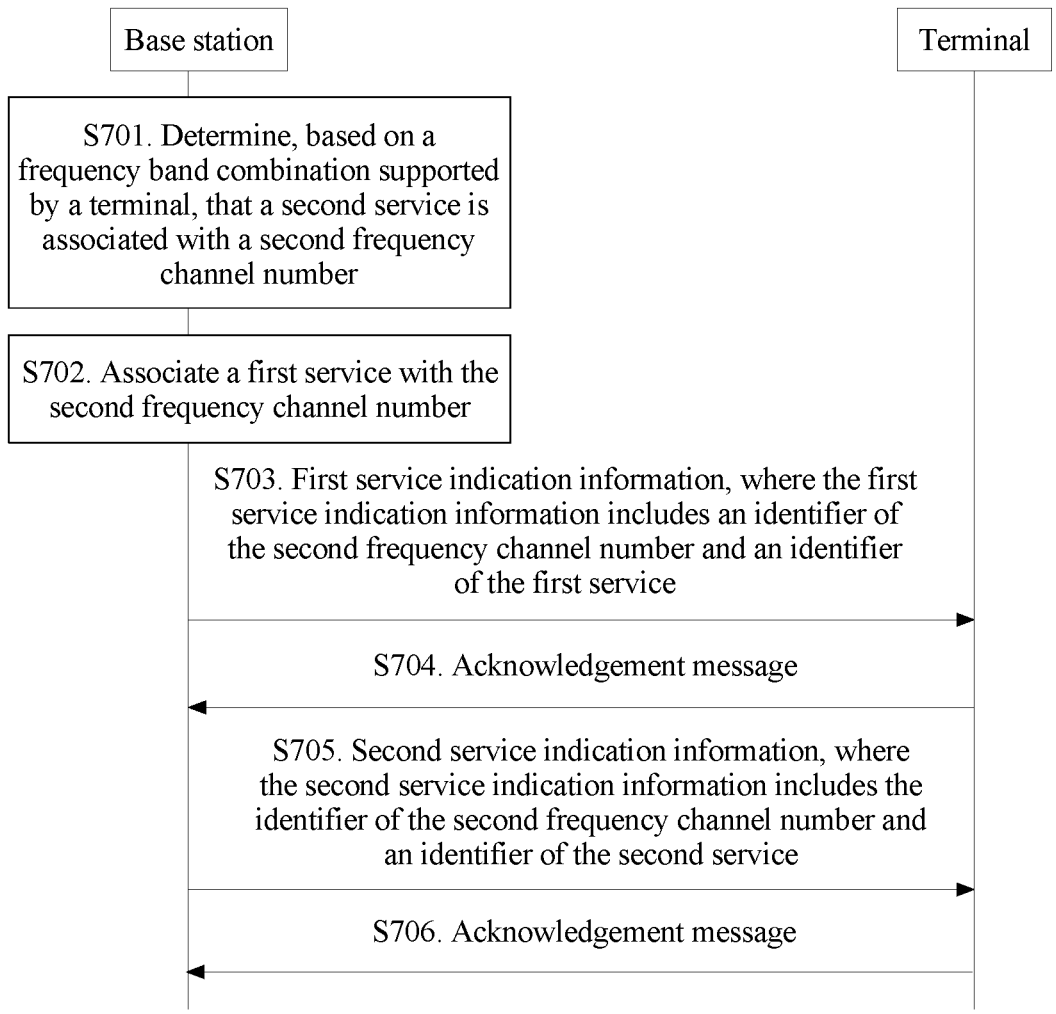
FIG. 7 is a communication schematic diagram of another service indication method according to an embodiment of the present disclosure.

FIG. 7 is a communication schematic diagram of yet another service indication method according to an embodiment of the present disclosure. The method is used in a communications system, the communications system includes a base station and a terminal, the terminal supports both a first frequency channel number and a second frequency channel number, and a physical frequency of the first frequency channel number is the same as a physical frequency of the second frequency channel number.

As shown in FIG. 7, the method includes the following operations.

Operation S701. The base station determines, based on a frequency band combination supported by the terminal, that a second service is associated with the second frequency channel number.

The frequency band combination supported by the terminal includes a frequency band corresponding to the second frequency channel number.

For example, the second frequency channel number supports a band 17, and the frequency band combination supported by the terminal is the band 17 and a band 12, or the terminal supports only the band 17.

Operation S702. The base station associates a first service with the second frequency channel number.

In this embodiment, the frequency band combination supported by the terminal is first determined based on a CA band combination capability reported by the terminal, and then it is determined, based on a frequency band corresponding to the first frequency channel number and the frequency band corresponding to the second frequency channel number, that the frequency band combination supported by the terminal includes the frequency band corresponding to the second frequency channel number. Preferably, a to-be-indicated service is associated with the second frequency channel number based on services indicated by the second frequency channel number.

The base station determines that the second service is associated with the second frequency channel number. The first service may be originally associated with the second frequency channel number. The first service may alternatively be originally associated with the first frequency channel number, and the base station associates the first service with the second frequency channel number through switching.

Operation S703. The base station sends first service indication information to the terminal. The first service indication information includes an identifier of the second frequency channel number and an identifier of the first service.

Operation S704. The terminal sends an acknowledgement message to the base station.

The base station first indicates the first service, for example, measurement triggered by an MR algorithm/a handover algorithm/an ANR algorithm, such as "A3/A4/A5". After receiving the first service indication information, the terminal feeds back the acknowledgement message.

Operation S705. The base station sends second service indication information to the terminal, where the second service indication information includes the identifier of the second frequency channel number and an identifier of the second service.

Operation S706. The terminal sends an acknowledgement message to the base station.

S704 and S706 are optional operations.

In this embodiment of the present disclosure, the base station first determines, based on the frequency band combination supported by the terminal, that the frequency band combination supported by the terminal includes the frequency band corresponding to the second frequency channel number, further associates the first service with the second frequency channel number, and uses the second frequency channel number as an indication object when sending a service indication. To be specific, the base station sends the first service indication information to the terminal, where the first service indication information includes the identifier of the second frequency channel number and the identifier of the first service. Subsequently, the base station sends the second service indication information to the terminal, where the second service indication information includes the identifier of the second frequency channel number and the identifier of the second service, so that a frequency channel number of a to-be-indicated service is first unified, and then an indication is performed, avoiding a service conflict caused by a same physical frequency.

Further, before the base station determines, based on the frequency band combination supported by the terminal, that the second service is associated with the second frequency channel number, the base station determines the first service and the second service that need to be performed by the terminal.

To be specific, the base station first knows the first service and the second service that need to be indicated, and may also know that the first service is based on the first frequency channel number, and the second service is based on the second frequency channel number. After finding that the physical frequency of the first frequency channel number is the same as the physical frequency of the second frequency channel number, the base station determines that the frequency band combination supported by the terminal includes the frequency band corresponding to the second frequency channel number, and then indicates the first service and the second service based on the second frequency channel number.

In one embodiment, the frequency band combination supported by the terminal does not include the frequency band corresponding to the first frequency channel number. For example, in some cases, a terminal to which a service is to be indicated supports only a secondary frequency band, but the first frequency channel number is a primary frequency channel number and corresponds to a primary frequency band.

In one embodiment, the first frequency channel number is the primary frequency channel number, and the second frequency channel number is a secondary frequency channel number.

The first service includes at least one of the following: MR algorithm measurement, handover algorithm measurement, or ANR algorithm measurement. The second service may be a CA measurement service.

The solutions provided in the embodiments of the present disclosure are mainly described above from a perspective of interaction between different network elements. It may be understood that, to implement the foregoing functions, the base station and the terminal include a corresponding hardware structure and/or software module for performing functions. With reference to units and algorithm operations of each example described in the embodiments disclosed in the present disclosure, the embodiments of the present disclosure can be implemented in a form of hardware or a combination of hardware and computer software. Whether a function is performed by hardware or by driving hardware by computer software depends on particular applications and design constraints of the technical solutions. A person skilled in the art may use different methods for each particular application to implement the described functions, but it should not be considered that the implementation goes beyond the scope of the technical solutions of the embodiments of the present disclosure.

In the embodiments of the present disclosure, the base station, the terminal, and the like may be divided into functional units based on the foregoing method examples. For example, the functional units may be obtained through division based on corresponding functions, or two or more functions may be integrated into one processing unit. The integrated unit may be implemented in a form of hardware, or may be implemented in a form of a software functional unit. It should be noted that unit division in the embodiments of the present disclosure is an example, and is merely logical function division. There may be another division manner in actual implementation.

Figure 8:
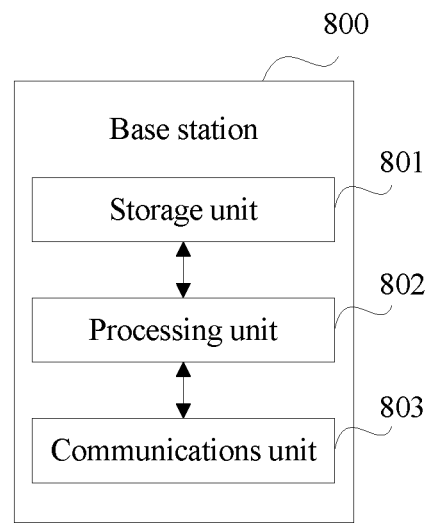
FIG. 8 is a schematic block diagram of a base station according to an embodiment of the present disclosure.

When an integrated unit is used, FIG. 8 is a schematic block diagram of a base station according to an embodiment of the present disclosure. A base station 800 includes a processing unit 802 and a communications unit 803. The processing unit 802 is configured to control and manage an action of the base station 800. For example, the processing unit 802 is configured to support the base station 800 in performing the processes S401, S402, and S403 in FIG. 4, the processes S501 and S503 in FIG. 5, the processes S601, S603, S606, S607, and S609 in FIG. 6, the processes S701, S702, S703, and S705 in FIG. 7 and/or another process of a technology described in this specification. The communications unit 803 is configured to support the base station 800 in communicating with a terminal or another network entity. The base station 800 may further include a storage unit 801, configured to store program code and data of the base station 800.

The processing unit 802 may be a processor or a controller. The communications unit 803 may include a communications interface, a transceiver, a transceiver circuit, or the like, and the communications interface is a general term. In specific implementation, the communications interface may include a plurality of interfaces, for example, may include an interface between base stations, an interface between a base station and a core network device and/or another interface. The storage unit 801 may be a memory.

Figure 9:
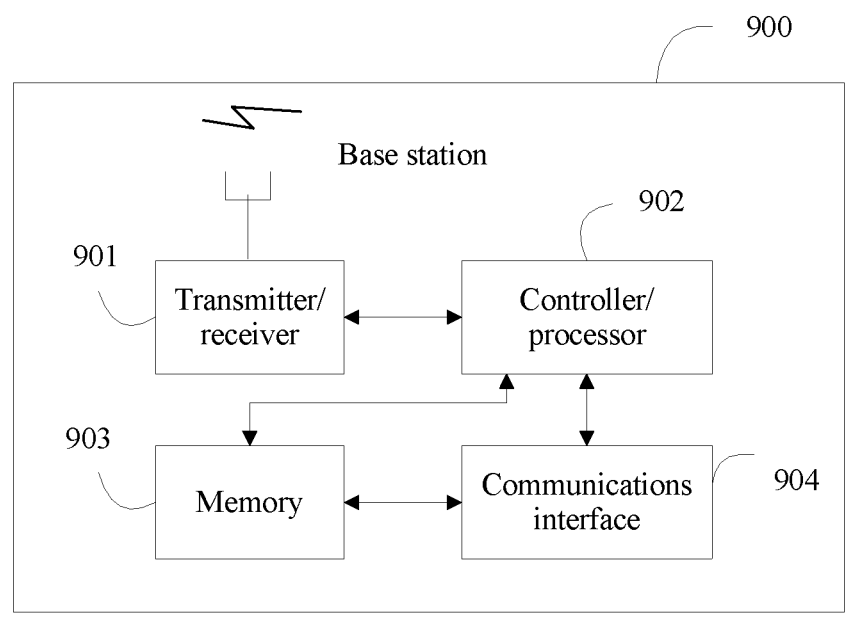
FIG. 9 is a schematic structural diagram of a base station according to an embodiment of the present disclosure.

When the processing unit 802 is a processor, the communications unit 803 is a transceiver, and the storage unit 801 is a memory, a structure of the base station provided in this embodiment of the present disclosure may be a structure of a base station shown in FIG. 9.

FIG. 9 is a possible schematic structural diagram of a base station according to an embodiment of the present disclosure.

A base station 900 includes a transmitter/receiver 901 and a processor 902. The "transmitter/receiver 901" indicates a transceiver with a function of a transmitter and/or a function of a receiver. The processor 902 may also be a controller, and is indicated as a "controller/processor 902" in FIG. 9. The transmitter/receiver 901 is configured to: support the base station in sending/receiving information to/from the terminal in the foregoing embodiments, and support radio communication between the terminal and another terminal. The processor 902 performs various functions for communication with the terminal. On an uplink, an uplink signal from the terminal is received by using an antenna, is demodulated (for example, a high frequency signal is demodulated into a baseband signal) by the receiver 901, and is further processed by the processor 902, to restore service data and signaling information sent by the terminal. On a downlink, service data and a signaling message are processed by the processor 902, and are modulated (for example, a baseband signal is modulated into a high frequency signal) by the transmitter 901, to generate a downlink signal, and the downlink signal is transmitted to the terminal by using the antenna. It should be noted that the foregoing demodulation or modulation function may be alternatively implemented by the processor 902. The processor 902 is further configured to perform the processing processes of the base station in the methods shown FIG. 4 to FIG. 7 and/or another process of the technical solutions described in this application.

Further, the base station 900 may further include a memory 903, and the memory 903 is configured to store program code and data of the base station 900. The base station may further include a communications interface 904, configured to support the base station 900 in communicating with another network communications entity (for example, a core network device).

It may be understood that FIG. 9 shows merely a simplified design of the base station 900. In actual application, the base station 900 may include any quantity of transmitters, receivers, processors, controllers, memories, communications units, and the like, and all base stations that can implement the embodiments of the present disclosure fall within the protection scope of the embodiments of the present disclosure.

Figure 10:
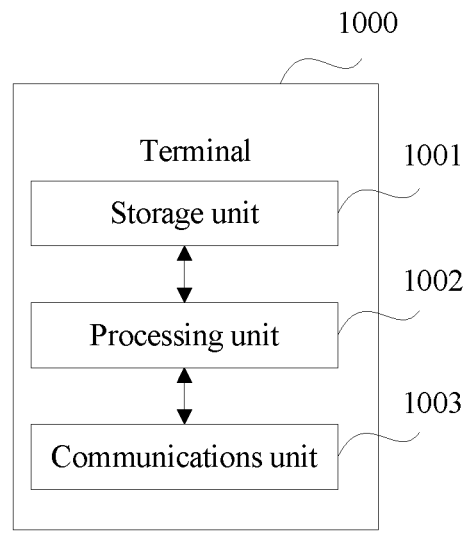
FIG. 10 is a schematic block diagram of a terminal according to an embodiment of the present disclosure.

When an integrated unit is used, FIG. 10 is a schematic block diagram of a possible terminal according to an embodiment of the present disclosure. A terminal 1000 includes a processing unit 1002 and a communications unit 1003. The processing unit 1002 is configured to control and manage an action of the terminal 1000. For example, the processing unit 1002 is configured to support the terminal 1000 in performing the processes S502 and S504 in FIG. 5, the processes S602, S604, S605, and S608 in FIG. 6, the processes S704 and S706 in FIG. 7 and/or another process of a technology described in this specification. The communications unit 1003 is configured to support the terminal 1000 in communicating with a base station or another network element. The terminal 1000 may further include a storage unit 1001, configured to store program code and data of the terminal 1000.

Figure 11:
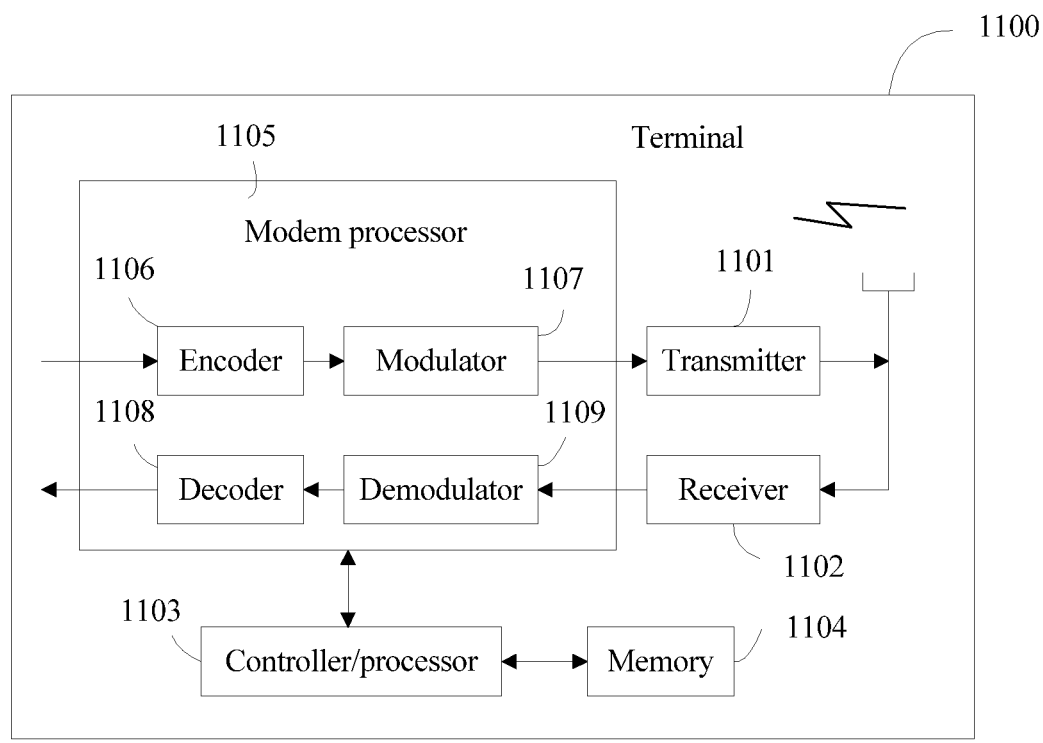
FIG. 11 is a schematic structural diagram of a terminal according to an embodiment of the present disclosure.

When the processing unit 1002 is a processor, the communications unit 1003 is a transceiver, and the storage unit 1001 is a memory, the terminal in this embodiment of the present disclosure may be a terminal shown in FIG. 11.

FIG. 11 is a simplified schematic diagram of a possible design structure of a terminal according to an embodiment of the present disclosure. The terminal 1100 includes a receiver 1102. The terminal 1100 may further include a transmitter 1101 and a processor 1103. The processor 1103 may also be a controller, and is indicated as a "controller/processor 1103" in FIG. 11. In one embodiment, the terminal 1100 may further include a modem processor 1105, and the modem processor 1105 may include an encoder 1106, a modulator 1107, a decoder 1108, and a demodulator 1109.

In an example, the transmitter 1101 adjusts (for example, through analog conversion, filtering, amplification, and up-conversion) an output sample and generates an uplink signal. The uplink signal is transmitted to the base station in the foregoing embodiments by using an antenna. On a downlink, an antenna receives a downlink signal transmitted by a base station in the foregoing embodiment. The receiver 1102 adjusts (for example, through filtering, amplification, down-conversion, and digitization) a signal received from the antenna and provides an input sample. In the modem processor 1105, the encoder 1106 receives service data and a signaling message that are to be sent on an uplink, and processes (for example, through formatting, coding, and interleaving) the service data and the signaling message. The modulator 1107 further processes (for example, through symbol mapping and modulation) coded service data and a coded signaling message, and provides an output sample. The demodulator 1109 processes (for example, through demodulation) the input sample and provides symbol estimation. The decoder 1108 processes (for example, through de-interleaving and decoding) the symbol estimation and provides decoded data and a decoded signaling message that are to be sent to the terminal 1100. The encoder 1106, the modulator 1107, the demodulator 1109, and the decoder 1108 may be implemented by the integrated modem processor 1105. The units perform processing based on a radio access technology (for example, access technologies of LTE and another evolved system) used in a radio access network. It should be noted that when the terminal 1100 does not include the modem processor 1105, the foregoing functions of the modem processor 1105 may be implemented by the processor 1103.

The processor 1103 controls and manages an action of the terminal 1100, and is configured to perform processing processes performed by the terminal 1100 in the foregoing embodiments of the present disclosure. For example, the processor 1103 is further configured to perform the processing processes of the terminal in the methods shown FIG. 4 to FIG. 7 and/or another process of the technical solutions described in this application.

Further, the terminal 1100 may further include a memory 1104, and the memory 1104 is configured to store program code and data used for the terminal 1100.

Methods or algorithm operations described in combination with the content disclosed in the embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a base station or a terminal. Certainly, the processor and the storage medium may exist in a base station or terminal as discrete components.

A person skilled in the art should be aware that in the foregoing one or more examples, functions described in the embodiments of the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present disclosure are further described in detail. It should be understood that the foregoing descriptions are merely specific implementations of the embodiments of the present disclosure, but are not intended to limit the protection scope of the embodiments of present disclosure. Any modification, equivalent replacement, or improvement made based on technical solutions of the embodiments of the present disclosure shall fall within the protection scope of the embodiments of the present disclosure.

What is claimed is:

1. A service indication method, used in a communications system, wherein the communications system comprises a base station and a terminal, the terminal supports a first frequency channel number and a second frequency channel number, a physical frequency of the first frequency channel number is the same as a physical frequency of the second frequency channel number, and the method comprises:
    sending, by the base station, first service indication information to the terminal, wherein the first service indication information comprises an identifier of the first frequency channel number and an identifier of a first service associated with the first frequency channel number;
    determining, by the base station, a second service associated with the second frequency channel number; and
    sending, by the base station, second service indication information to the terminal, wherein the second service indication information comprises the identifier of the first frequency channel number and an identifier of the second service, wherein the first frequency channel number is a primary frequency channel number, and the second frequency channel number is a secondary frequency channel number; and after the sending, by the base station, second service indication information to the terminal, the method further comprises:
    sending, by the base station, a deletion instruction to the terminal, wherein the deletion instruction is used to instruct the terminal to delete the first service indication information and the second service indication information;
    determining, by the base station, a third service associated with the second frequency channel number; and
    sending, by the base station, third service indication information to the terminal, wherein the third service indication information comprises an identifier of the second frequency channel number and an identifier of the third service.

2. The method according to claim 1, wherein the first service comprises at least one of the following: a measurement report (MR) algorithm measurement service, a handover algorithm measurement service, or an automatic neighbor relation (ANR) algorithm measurement service; and the second service comprises a carrier aggregation measurement service.

3. A service indication method, used in a communications system, wherein the communications system comprises a base station and a terminal, the terminal supports a first frequency channel number and a second frequency channel number, a physical frequency of the first frequency channel number is the same as a physical frequency of the second frequency channel number, and the method comprises:
    receiving, by the terminal, first service indication information from the base station, wherein the first service indication information comprises an identifier of the first frequency channel number and an identifier of a first service associated with the first frequency channel number; and
    receiving, by the terminal, second service indication information from the base station, wherein the second service indication information comprises the identifier of the first frequency channel number and an identifier of a second service associated with the second frequency channel number, wherein the first frequency channel number is a primary frequency channel number, and the second frequency channel number is a secondary frequency channel number; and
    after the receiving, by the terminal, second service indication information from the base station, the method further comprises:
    receiving, by the terminal, a deletion instruction from the base station, wherein the deletion instruction is used to instruct the terminal to delete the first service indication information and the second service indication information;
    deleting, by the terminal, the first service indication information and the second service indication information based on the deletion instruction; and
    receiving, by the terminal, third service indication information from the base station, wherein the third service indication information comprises an identifier of the second frequency channel number and an identifier of a third service associated with the second frequency channel number.

4. The method according to claim 3, wherein the first service comprises at least one of the following: a measurement report (MR) algorithm measurement service, a handover algorithm measurement service, or an automatic neighbor relation (ANR) algorithm measurement service; and the second service comprises a carrier aggregation measurement service.

5. A base station, used in a communications system, wherein the communications system comprises the base station and a terminal, the terminal supports both a first frequency channel number and a second frequency channel number, a physical frequency of the first frequency channel number is the same as a physical frequency of the second frequency channel number, and the base station comprises:

a transmitter, configured to send first service indication information to the terminal, wherein the first service indication information comprises an identifier of the first frequency channel number and an identifier of a first service associated with the first frequency channel number; and a processor, configured to determine a second service associated with the second frequency channel number, wherein the transmitter is further configured to send second service indication information to the terminal, wherein the second service indication information comprises the identifier of the first frequency channel number and an identifier of the second service, wherein the first frequency channel number is a primary frequency channel number, and the second frequency channel number is a secondary frequency channel number;

the transmitter is further configured to send a deletion instruction to the terminal, wherein the deletion instruction is used to instruct the terminal to delete the first service indication information and the second service indication information;

the processor is further configured to determine a third service associated with the second frequency channel number;

and the transmitter is further configured to send third service indication information to the terminal, wherein the third service indication information comprises an identifier of the second frequency channel number and an identifier of the third service.

6. The base station according to claim 5, wherein the first service comprises at least one of the following: a measurement report (MR) algorithm measurement service, a handover algorithm measurement service, or an automatic neighbor relation (ANR) algorithm measurement service; and the second service comprises a carrier aggregation measurement service.

7. A terminal, used in a communications system, wherein the communications system comprises a base station and the terminal, the terminal supports both a first frequency channel number and a second frequency channel number, a physical frequency of the first frequency channel number is the same as a physical frequency of the second frequency channel number, and the terminal comprises:

a receiver, configured to: receive first service indication information from the base station, wherein the first service indication information comprises an identifier of the first frequency channel number and an identifier of a first service associated with the first frequency channel number; and receive second service indication information from the base station, wherein the second service indication information comprises the identifier of the first frequency channel number and an identifier of a second service associated with the second frequency channel number, wherein the first frequency channel number is a primary frequency channel number, the second frequency channel number is a secondary frequency channel number, and the terminal further comprises a processor;

the receiver is further configured to receive a deletion instruction from the base station, wherein the deletion instruction is used to instruct the terminal to delete the first service indication information and the second service indication information;

the processor is configured to delete the first service indication information and the second service indication information based on the deletion instruction; and the receiver is further configured to receive third service indication information from the base station, wherein the third service indication information comprises an identifier of the second frequency channel number and an identifier of a third service associated with the second frequency channel number.

8. The terminal according to claim 7, wherein the first service comprises at least one of the following: a measurement report (MR) algorithm measurement service, a handover algorithm measurement service, or an automatic neighbor relation (ANR) algorithm measurement service; and the second service comprises a carrier aggregation measurement service.

\* \* \* \* \*